March 14, 1961 R. J. BERNOTAS 2,974,430
STEERABLE MATERIAL HANDLING DEVICE
Filed April 8, 1957 3 Sheets-Sheet 1

INVENTOR.
Ralph J. Bernotas
BY
R. P. Barnard
ATTORNEY

March 14, 1961 R. J. BERNOTAS 2,974,430
STEERABLE MATERIAL HANDLING DEVICE
Filed April 8, 1957 3 Sheets-Sheet 2

INVENTOR.
Ralph J. Bernotas
BY
R. F. Barnard
ATTORNEY

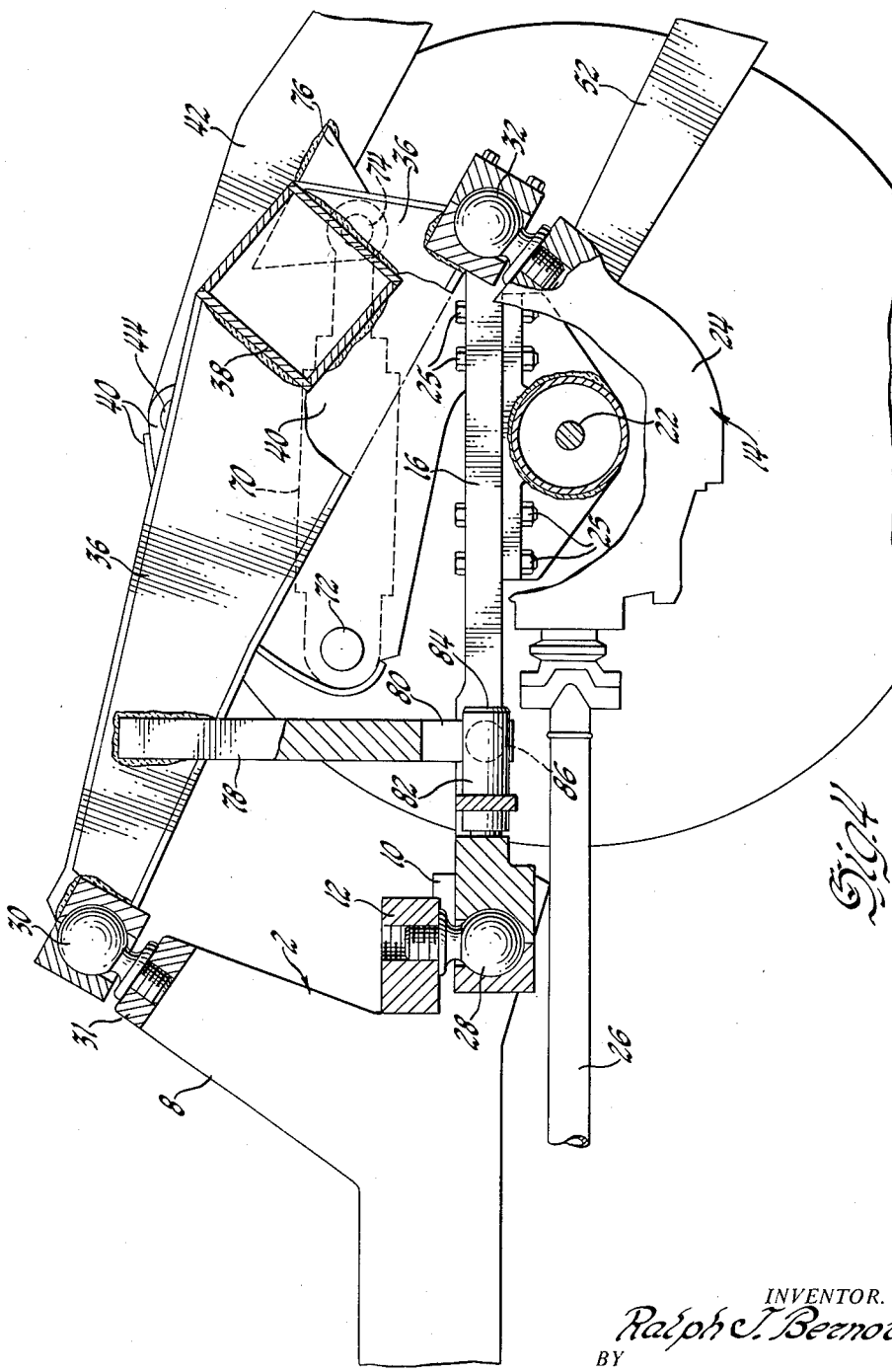

United States Patent Office 2,974,430
Patented Mar. 14, 1961

2,974,430

STEERABLE MATERIAL HANDLING DEVICE

Ralph J. Bernotas, South Euclid, Ohio, assignor to General Motors Corporation, Detroit, Mich., a corporation of Delaware Filed Apr. 8, 1957, Ser. No. 651,518

14 Claims. (Cl. 37—144)

The present invention relates to a steerable material handling vehicle in which the material handling structure is entirely supported as a unit on a steerable portion of the vehicle. More particularly, the present invention relates to a steerable material handling vehicle comprising relatively articulable frame sections as shown in my copending application S.N. 629,933, filed December 21, 1956, now Patent No. 2,941,612, and which vehicle may be supplied with a material engaging blade and support linkage therefor.

In prior known devices of the type herein contemplated on which there have been mounted material-engaging blade structures such as an angle or bulldozer blade, it has been common to mount the blade element on relatively long push arms pivotally attached at their rear ends to the vehicle frame so that the blade element would be stabilized by the rear axle of the vehicle. In the more common type of structure, such as a crawler tractor, steering is accomplished by controlling the flow of power to, or braking one or the other, flexible vehicle supporting tracks.

Where such a blade structure has been mounted on a rubber-tired vehicle, the long push arms have again been connected to the main portion of the vehicle or otherwise stablized by the vehicle rear axle. In such embodiments, the vehicle may be provided with a pair of conventional steerable rear wheels. One primary disadvantage of such structures has been that, in steering the vehicle while making a cut with the blade element, the rear steering wheels ride out of the cut, thereby disrupting the attitude of the blade element relative to the material through which it is passing.

Furthermore, in such conventional structures in which relatively long push arms or beams for supporting the blade element are employed, the usual skid shoe mounted on the beams for aiding in securing a cut to a desired depth has interfered with the cutting operation of such blade element.

Moreover, referring to dozer vehicles in general, it has been common practice to employ some means acting directly on the dozer blade element to accomplish tilting of the blade in a plane transverse of the longitudinal axis of the vehicle. One common form of mechanism so employed comprises an operating means connected between the dozer blade and its supporting push arms or beams. As will appear more fully hereinafter, the present invention is directed to a novel means for accomplishing such an adjustment by utilizing an adjustment mechanism acting on a blade supporting structure to selectively position the entire blade supporting unit in a desired material engaging attitude.

Within the scope of the present invention, it is contemplated to provide a material handling element adapted for interchangeable mounting with the front end loader construction disclosed in my aforementioned copending application.

It is further contemplated to provide a blade structure for a vehicle comprising two relatively articulable steerable frame sections on which the blade structure may be mounted as a unit.

Of particular significance, it is intended that the aforementioned blade will be stabilized off the rear wheels of the vehicle while permitting steering of the front wheels thereof without disrupting the cutting action of the blade by reason by the wheels riding out of the cut.

It is a principal feature of this invention to mount as a unit a material handling blade element on a vehicle comprising main and auxiliary frame sections operatively connected on a vertical axis for steering and on a horizontal longitudinally extending axis for relative oscillation therebetween, the blade element supporting structure being connected to the vehicle in such a manner as to permit relative frame oscillation without disrupting the material engaging attitude of the blade element.

It is further contemplated within the scope of this invention to provide a structure of the type aforementioned in which blade assembly may be selectively controlled to adjust the attitude of the blade relative to the material it is handling.

It is a principal object of this invention to provide a steerable material handling device comprising main and auxiliary frame sections, means for interconnecting said sections for steering articulation about a vertical axis and for relative oscillation about a horizontal longitudinally extending axis, a structural member interconnecting the main and auxiliary frame sections on the aforementioned axes and adjustably mounting thereon a blade element and supporting structure therefor, the operative connection of the structural member between the main and auxiliary frames being such as to permit relative frame oscillation without disturbing the selected attitude of the blade element with respect to the material it is engaging.

It is another object of this invention to include in the operative connection of the aforementioned structural member to the respective vehicle frame members a control means which may be selectively actuated to tilt the blade element transversely of the direction of travel of the vehicle.

It is a further object of this invention to provide a material handling blade structure for mounting on a vehicle of the type aforementioned in which the relatively articulable frames may be moved relative to each other for steering without causing the vehicle to ride out of the cut being made by the blade element.

It is further contemplated within the scope of this invention to provide a novel blade structure operatively connected to a steerable vehicle in which the blade element supporting structure comprises relatively short supporting beams or links on which there may be mounted skid shoes which will not interfere with the digging action of the blade.

It is further contemplated within the scope of this invention to provide a supporting structure for a blade element of the type described which comprises what may be termed a quadrangular or distorted parallelogram linkage operatively connected between the blade element and the vehicle whereby, upon vertically adjusting the blade element, the top edge of the blade will be pitched forwardly relative to its digging position. Such a blade structure results in the vehicle equipped with such a blade being more advantageously employed in stockpiling material and in heavy pioneering work, as will appear more fully hereinafter.

These and other features and objects of this invention will appear more fully hereinafter as the description of the invention proceeds, and as reference is made to the following drawings in which:

Figure 4 is an enlarged fragmentary view corresponding to Figure 1, partly in section and partly broken away, illustrating certain details of this invention.

Figure 1:
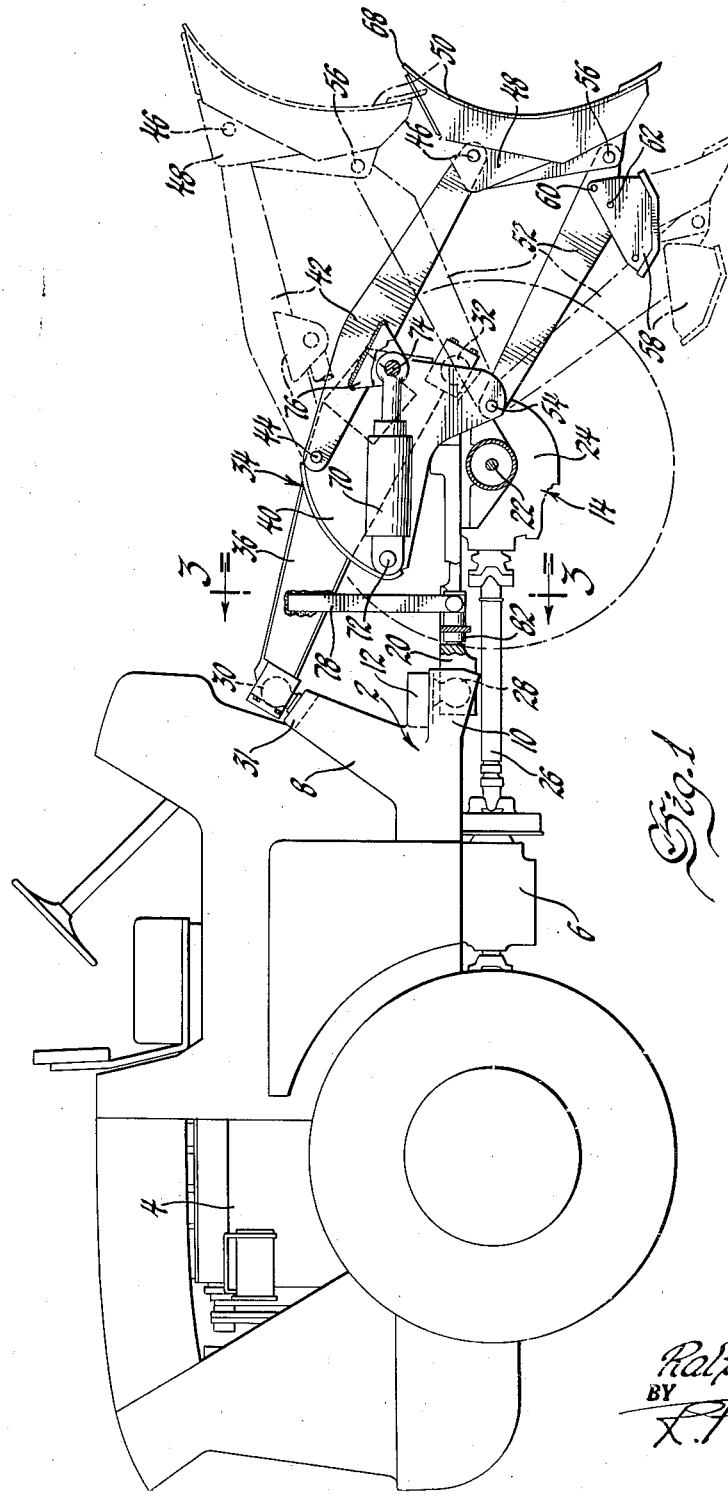
Figure 1 is a side elevation, partly in phantom and partly broken away, of the steerable material handling apparatus of this invention.

Referring now to the drawings, there is shown a rubber-tired tractor having a main frame 2 on which there is mounted behind the vehicle operator's compartment a power plant 4 for transmitting drive through the transmission 6 to the rear axle. Near its forward end, the main frame has an upwardly and forwardly inclined horseneck 8 of substantially rectangular construction which at its top overlies two laterally spaced forwardly presented horizontal projections 10 on the main frame between which there is a third projection 12. This basic vehicle and particularly, the steerable auxiliary frame 14 is clearly disclosed in my aforementioned application. Suffice it to say, the frame 14 comprises two laterally spaced forwardly extending legs 16 and a rearwardly projecting tongue 20. A front axle 22 and differential housing construction 24 are rigidly bolted as indicated at 25 in Figure 4 to the auxiliary frame 14 so as to extend laterally between the legs thereof. A constant velocity drive line 26 transmits drive from the transmission 6 to the front axle 22 so as to provide a vehicle having a four-wheel drive.

It may be seen that the auxiliary frame tongue 20 has a suitably formed socket therein to universally or swivelly or pivotally receive the downwardly presented ball 28 secured in the forward projection 12 of the main frame 2. A similar ball 30 is secured to the upper horizontally extending wall 31 of the horseneck 8 of the main frame in vertical alignment with the ball 28. A third ball 32 is rigidly secured to the differential housing construction 24 in horizontal longitudinally extending alignment with the downwardly presented ball 28. As will appear more fully hereinafter, a unitary blade mechanism 34 is operatively connected between the main vehicle frame 2 and the steerable auxiliary frame 14.

The vehicle structure described thus far corresponds to that shown in my aforementioned copending application. As set forth in that application, the frame members 2 and 14 are adapted to be operatively interconnected not only at the ball member 28 but also by a structural member or compression link to be described, extending between the ball members 30 and 32. It will be noted that in the forward steering position as shown in the drawings, the three ball members are substantially in a vertical longitudinally extending plane passing through the mid-point of the vehicle. Moreover, the ball connections 28 and 30 define a vertical steering axis about which the respective vehicle frames may be selectively articulated, while the ball joint connections 28 and 32 define a horizontal longitudinally extending axis about which the auxiliary and main frames may oscillate relative to each other. Where all four wheels of the vehicle drive, as shown in the preferred embodiment of this invention, such a horizontal axis of oscillation is desirable to prevent the vehicle from being supported by only one rear wheel and the diametrically opposite front wheel while traversing irregular terrain. Such a condition would result in loss of drive due to the differential action in the respective axle final drives. The construction aforementioned precludes this condition from occurring, it being understood that suitable stop means can be incorporated in the construction to limit to any desired degree the amount of relative frame oscillation.

Any suitable means may be employed for bodily articulating the frame sections 2 and 14 about the aforementioned vertical steering axis. A preferable arrangement is disclosed in my copending application in which two laterally spaced fluid-operated steering jacks (not shown) each have one end pivotally connected in a conventional manner to the respective forward ends of the wishbone auxiliary frame legs 16 and to the forwardly extending projections 10 formed on the main frame substantially equidistant from the universal connection 28 of the latter to the auxiliary frame tongue 20.

Referring now to the blade mechanism, a structural member or compression link 36 is universally pivotally mounted on the respective ball members 30 and 32. At its forward end, the member 36 is provided with a transversely extending cross-piece 38 to the ends of which there are rigidly secured the mounting plates 40. A pair of upper control links 42 are each pivotally connected at 44 to the respective plates 40 and at 46 to a bracket structure 48 rigidly secured to the rear face of the blade element 50. Lower control links 52 are similarly pivotally connected at 54 to the plates 40 and at 56 to the brackets 48. An adjustable skid or shoe 58 is pivotally connected to one, and preferably both, of the lower control links at 60 and include any desired number of apertures 62 adapted to secure the shoe in a selected height relative to the lower link and blade 50 by inserting therethrough, and through an aligned aperture in the lower control link, a pin carried on a chain secured to shoe (not shown). A reinforcing tubular strut 64 extends between the lower control links 52.

It will be noted that the respective points of pivotal connection of the upper and lower control links to the plates 40 and bracket 48 of the blade 50 form what may be termed a quadrangular, or distorted parallelogram, linkage which will adjust or pitch the upper edge 68 of the blade element 50 forwardly as the aforementioned support linkage is adjusted vertically. In other words, as the blade supporting structure is adjusted vertically, the arc described by the lower link pivot 56 about the pivot 54 is such relative to the arc described by the upper link pivot 46 about the pivot 44 so that the first-named arc will operate to pull inwardly on the lower edge of the blade 50 while the upper edge 68 will be pitched forwardly. To accomplish vertical adjustment of this support linkage, a pair of fluid motors 70 are each pivotally connected at 72 to a plate 40, and at 74 to a bracket 76 rigidly secured as by welding to the upper control links 42. These hydraulic jacks are, of course, adapted to be controlled by any suitable hydraulic system.

Figure 3:
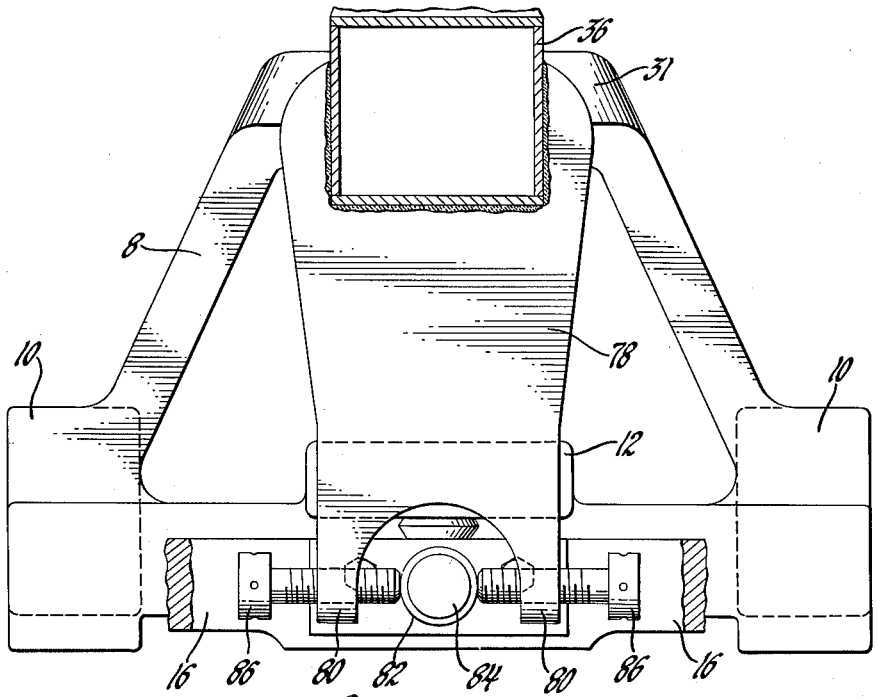
Figure 3 is a cross section along line 3—3 of Fig. 1.

The structural member 36 includes a blade stabilizing and adjusting member or lever 78 having one end rigidly secured thereto while the other end terminates in two laterally spaced legs 80. These legs are spaced to either side of a cylindrical bushing 82 frictionally receiving a pin 84 rigidly secured to or formed integral with the auxiliary steerable frame member 14 between the legs thereof. It will be noted from Figs. 1 and 3 that this pin extends forwardly from the base of the auxiliary frame legs opposite the tongue 20 of the auxiliary frame and on the axes of frame oscillation aforementioned between the ball members 28 and 32. Adjustably mounted in each of the depending spaced legs of the member 78 is an adjustment screw 86 having its inner end adjustably engaging the bushing 82 surrounding the pin 84.

It will be noted by referring to Fig. 1 that the blade supporting links are relatively short compared to prior art constructions in which push beams extend rearwardly for pivotal connection to the main vehicle frame. In such prior art devices, the ratio of the distance of the pivotal connection of the push beams to the main frame from the base or ground-engaging portion of the shoe 58 and the distance between this pivotal connection and the lower cutting edge of the blade 50 is relatively large. Accordingly, when the blade would initially begin to dig, and thereby be pulled down into the material, the skid or shoe would be pulled down and interfere with such operation by engaging the uncut ground. This deleterious effect is particularly pronounced where the blade begins a cut in hard material, in which instance the shoe adds to the resistance of the blade in penetration. Comparatively speaking, by using the blade supporting structure of this invention, the ratio of the distance between the bottom of the shoe 58 and the pivot point 54 and the distance between the lower blade edge and this pivotal connection is relatively considerably less. With a linkage and shoe arrangement as shown in Fig. 1, the blade will cut to the depth desired while the shoe is carried out of interfering relation with the ground. As the entire vehicle rides into the cut, the operator may manipulate the linkage so that the vehicle will travel along with the blade set for the desired depth of cut while the shoe acts as a skid.

Figure 2:
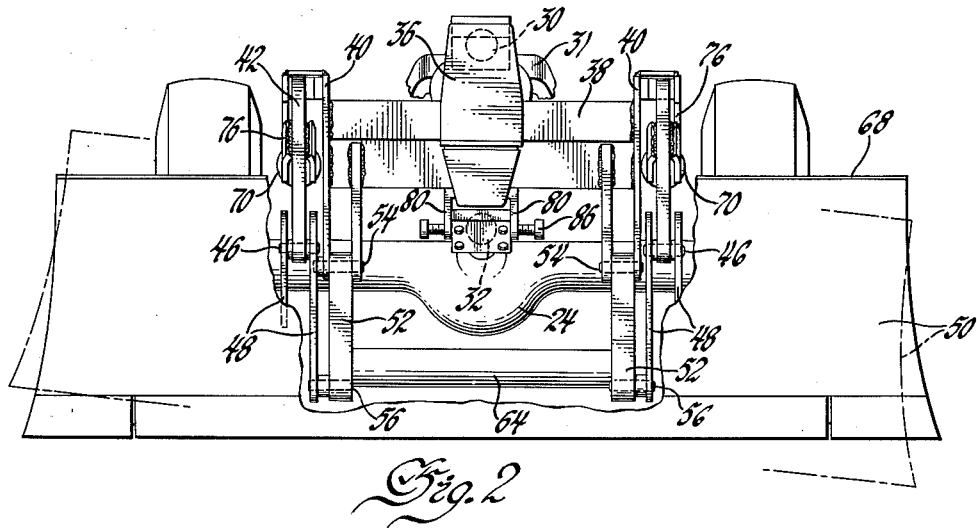
Figure 2 is a front elevation, partly broken away, of the steerable material handling apparatus of this invention.

In operation, and with the structure disposed substantially as shown in the drawings, the vehicle may pass over material in which a cut is to be made and the blade will remain substantially stabilized in the position shown irrespective of the irregularity of the terrain. In other words, as the wheels of the forward steerable frame 14 engage irregular terrain, relative frame oscillation will occur on the axis defined by the ball connections 28 and 32. However, the structural member 36 will remain substantially stationary because of the rotatable friction or lost motion connection formed between the screws 86 and bushing 82 surrounding the pin 84 secured to the auxiliary frame 14. Moreover, if the vehicle operator desires to tilt the blade element 50 transversely of the direction of the cut as shown in dotted lines in Fig. 2, he need only manipulate the screws 86 relative to the pin and bushing. Thus, the member 78 and the blade supporting member 36 would be rotated clockwise in Fig. 2 about the axis of the ball members 30 and 32 to achieve the tilted position of the blade. Thereafter, the blade element would be stabilized in this position as the vehicle traverses irregular terrain because of the aforedescribed lost motion connection between the member 78 and the pin 84.

It will be noted that due to the blade-supporting linkage, the upper edge 68 of the blade 50 will be pitched forwardly as the blade is adjusted upwardly to the dotted line position shown in Fig. 1. Thus, in a material stockpiling operation, the material is more efficiently piled toward the top of the heap. In some work, such as heavy pioneering work, the blade may be raised to its dotted line position so that the top edge 68 thereof will strike trees and other objects desired to be removed, thereby increasing the leverage applied in this operation as compared to prior structures in which the lower edge of the blade was employed.

It will be readily apparent from a comparison of the disclosure of this application and that of my copending application that the earth-working blade mechanism 34 as disclosed in this application may be relatively easily interchangeably mounted on the vehicle of my copending application. It is only necessary to remove the front end loader attachment and the compression link or structural member as shown in the copending application, and to replace the latter with the structural member 36 which entirely supports the blade element 50 and the supporting linkage therefor.

With the basic steerable multiple frame vehicle as disclosed in this and my copending application, the blade unit may dig while the vehicle is steered without causing tilting of the blade by reason of the wheels riding out of the cut. It will be apparent that the vertical steering axis defined by the ball members 28 and 30 can be so located as to provide a steerable vehicle in which the turning radii of the vehicle wheels will approximate each other. Thus, the transverse length of the blade will be such as to extend a little beyond the path of the wheels so that the latter will track in the cut. It is not necessary that the respective wheel turning radii be equal; the significant factor, as compared to prior art devices, is that the variance between them may be minimized so that an inordinately large blade will not be required. By comparison, in prior devices in which conventionally steered rear wheels are used, the turning radius of the latter is extremely large relative to the other wheels thereby requiring a large blade. Naturally, such a large blade is impractical and, hence, it is not employed resulting in the disadvantage aforementioned.

Having shown and disclosed a preferred form of this invention, it is to be understood that it is not intended to be limited by this one embodiment, but only by the scope of the claims which follow.

I claim:

1. A material handling vehicle comprising, a first frame section, a second frame section, means interconnecting said frame sections for relative pivotal movement therebetween, said means including a pivotal connection between the adjacent ends of said frame sections, a rigid link having one end pivotally connected to one frame section at a point spaced horizontally from the connection of the latter to said other frame section, the other end of said link being connected to said other frame section, the pivotal connections between said frame sections and between said one frame section and said rigid link establishing a horizontally extending axis of relative frame oscillation, an implement adjusting means mounted on said link, an implement carried by said adjusting means, and means for stabilizing said link and implement as said frame sections oscillate relative to each other, said stabilizing means including a pivotal connection between said rigid link and one of the frame sections.

2. A material handling vehicle comprising, a first frame, a second frame, means interconnecting said frame for relative pivotal movement therebetween, said means including a pivotal connection between the adjacent ends of said frames, a rigid link having one end pivotally connected to one frame at a point spaced horizontally forwardly from the connection of the latter to said other frame, the other end of said link being pivotally connected to said other frame, the pivotal connections between said frames and between said one frame and said rigid link establishing a horizontally extending axis of relative frame oscillation, an implement adjusting mechanism connected to said link, an implement mounted on said mechanism, and means for stabilizing said link and implement as said one frame oscillates relative to said other frame, said stabilizing means including a pivotal connection between said rigid link and said one frame on said horizontal axis.

3. A vehicle comprising, a main frame, an auxiliary frame, a pivotal connecttion between the adjacent ends of said frames, an implement structure supported on said vehicle, said structure comprising a supporting member, vertically adjustable control links pivotally connected to said member, means for vertically adjusting said control links, a material handling implement pivotally mounted at the free ends of said control links, one end of said supporting member being pivotally connected to said main frame, the other end of said member being pivotally connected to said auxiliary frame at a point spaced horizontally from the pivotal connection of the latter to said main frame, and means for stabilizing and adjusting said implement structure as relative frame oscillation occurs along the horizontal axis defined by said spaced pivotal connections of said auxiliary frame, respectively, to said main frame and supporting member, said stabilizing means including an adjustable pivotal connection between said supporting member and said auxiliary frame.

4. A material handling vehicle comprising a main frame, an implement supporting structural member swivelly connected at one point to said main frame, an auxiliary frame swivelly connected to said main frame and at another point on said structural member for relative oscillation thereto about a substantially longitudinally extending axis, a material working implement supported on said structural member, and lever means rigidly secured to said structural member and operatively adjustably connected to said vehicle for selectively swivelling said implement supporting structural member about the connections of the latter to said main and auxiliary frames.

5. A material handling vehicle comprising two frame sections, means including a structural member pivotally interconnecting said frames for relative oscillation of one of said frames relative to the other and said structural member about a substantially horizontally extending axis, a rigid lever secured to said structural member and pivotally connected to said one frame section whereby the latter may oscillate about said axis without disrupting the position of said structural member, said connection of said lever to said one frame section including selectively adjustable means for pivoting said structural member about the connections of the latter to said frame sections, a material engaging blade, quadrangular linkage pivotally connected to said blade and structural member to adjustably support the former on the latter, the respective pivotal connections of said linkage to said structural member and blade operating to pitch the upper edge of said blade forwardly as said blade is adjusted vertically upwardly, and means mounted on said structural member and connected to said linkage to adjust said blade upwardly.

6. A material handling vehicle comprising two frame sections, first connecting means pivotally interconnecting adjacent ends of said frame sections, a structural member, second connecting means pivotally connecting one end of said structural member to one of said frame sections at a point spaced vertically from said first connecting means, third connecting means pivotally connecting the other end of said structural member to the other of said frame sections at a point spaced horizontally from said first connecting means, said first and third connecting means defining a horizontal axis of frame section oscillation relative to each other and said structural member, a stabilizer member secured to said structural member, means connecting said stabilizer member to said vehicle on said horizontal axis, and a material handling implement mounted on said structural member.

7. A material handling vehicle comprising two frame sections, first connecting means pivotally interconnecting adjacent ends of said frame sections, a structural member, second connecting means pivotally connecting one end of said structural member to one of said frame sections at a point spaced vertically from said first connecting means, third connecting means pivotally connecting the other end of said structural member to the other of said frame sections at a point spaced horizontally from said first connecting means, said first and third connecting means establishing a horizontal axis of relative oscillation between said other frame section and said structural member, a stabilizer member secured to said structural member, means pivotally connecting said stabilizer member to said vehicle on said horizontal axis, and a material handling implement mounted on said structural member.

8. A material handling vehicle comprising two frame sections, first connecting means pivotally interconnecting adjacent ends of said frame sections, a structural member, second connecting means pivotally connecting one end of said structural member to one of said frame sections at a point spaced vertically from said first connecting means, third connecting means pivotally connecting the other end of said structural member to the other of said frame sections at a point spaced horizontally from said first connecting means, said first and third connecting means establishing a horizontal axis of relative oscillation between said other frame section and said structural member, means pivotally connecting said stabilizer member to said other frame section on said horizontal axis, and a material handling implement mounted on said structural member.

9. A material handling vehicle comprising two frame sections, a first ball joint pivotally interconnecting adjacent ends of said frame sections, a structural member, a second ball joint pivotally connecting one end of said structural member to one of said frame sections at a point spaced vertically from said first ball joint, a third ball joint pivotally connecting the other end of said structural member to the other of said frame sections at a point spaced horizontally from said first ball joint, said first and third ball joints establishing a horizontal axis of relative oscillation between said other frame section and said structural member, a stabilizer member secured to said structural member, means pivotally connecting said stabilizer member to said vehicle on said horizontal axis, and a material handling implement mounted on said structural member.

10. A material handling vehicle comprising two frame sections, first connecting means pivotally interconnecting adjacent ends of said frame sections, a structural member, second connecting means pivotally connecting one end of said structural member to one of said frame sections at a point spaced vertically from said first connecting means, third connecting means pivotally connecting the other end of said structural member to the other of said frame sections at a point spaced horizontally from said first connecting means, said first and third connecting means defining a horizontal axis of relative oscillation between said frame sections, said second and third connecting means defining an axis of adjustment of said structural member relative to said frame sections, a stabilizing and adjustment member secured to said structural member, adjustable means pivotally connecting said stabilizing and adjusting member to said vehicle on said horizontal axis of relative frame oscillation, said last-named means being selectively adjustable to pivot said structural member about said axis of adjustment, and a material handling implement mounted on said structural member.

11. A material handling vehicle comprising two frame sections, first connecting means pivotally interconnecting adjacent ends of said frame sections, a structural member, second connecting means pivotally connecting one end of said structural member to one of said frame sections at a point spaced vertically from said first connecting means, third connecting means pivotally connecting the other end of said structural member to the other of said frame sections at a point spaced horizontally from said first connecting means, a lever secured to said structural member, adjustable means pivotally connecting said lever to said other frame section on said horizontal axis, said last-named means being selectively adjustable to pivot said structural member about the axis defined by said second and third connecting means, and a material handling implement mounted on said structural member.

12. A material handling vehicle comprising two frame sections, a ball joint pivotally interconnecting adjacent ends of said frame sections, a structural member, a second ball joint pivotally connecting one end of said structural member to one of said frame sections at a point spaced vertically from said first ball joint, a third ball joint pivotally connecting the other end of said structural member to the other of said frame sections at a point spaced horizontally from said first ball joint, a lever secured to said structural member, adjustable means pivotally connecting said lever to said other frame section on said horizontal axis, said last-named means being adjustable to pivot said structural member about the axis defined by said second and third ball joints, and a material handling implement mounted on said structural member.

13. A material handling vehicle comprising a main frame, an auxiliary frame, a structural member, three triangularly spaced universal ball joints operatively interconnecting said main frame, auxiliary frame and structural member, a pair of said ball joints establishing a horizontally extending axis of oscillation of said auxiliary frame relative to said structural member, the third ball joint establishing with one of the other of said ball joints an axis of adjustment for said structural member, a stabilizing and adjustment lever rigidly secured to said structural member, adjustable means pivotally connecting said lever to said auxiliary frame on said axis of oscillation, said last-named means being adjustable to pivot said structural member about said axis of adjustment, and a material handling device supported entirely on said structural member.

14. A material handling vehicle comprising a main frame, an auxiliary frame, a structural member, a first ball joint pivotally interconnecting adjacent ends of said main and auxiliary frames, a second ball joint pivotally connecting one end of said structural member to said auxiliary frame horizontally forward of said first ball joint, a third ball joint spaced vertically above said first ball joint and pivotally connecting the other end of said structural member to said main frame, said first and second ball joints establishing a horizontally extending axis of oscillation of said auxiliary frame relative to said main frame and structural member, said second and third ball joints establishing an axis of adjustment of said structural member relative to said main and auxiliary frames, a stabilizing and adjustment lever rigidly secured to said structural member, adjustable means pivotally connecting said lever to said auxiliary frame on said axis of oscillation, said last-named means being adjustable to pivot said structural member about said axis of adjustment thereof, and a material handling device supported entirely on said structural member.

References Cited in the file of this patent

UNITED STATES PATENTS

| | | |
|---|---|---|
| 1,089,988 | Tichenor | Mar. 10, 1914 |
| 2,193,367 | Harrison et al. | Mar. 12, 1940 |
| 2,197,390 | Arndt | Apr. 16, 1940 |
| 2,386,483 | LeTourneau | Oct. 9, 1945 |
| 2,565,337 | Allan | Aug. 21, 1951 |
| 2,595,594 | Martin | May 6, 1952 |
| 2,604,708 | Washbond | July 29, 1952 |
| 2,683,496 | Prost | July 13, 1954 |
| 2,711,257 | Apel | June 21, 1955 |
| 2,787,391 | Matheson | Apr. 2, 1957 |
| 2,835,397 | Wagner | May 20, 1958 |
| 2,860,793 | Lapsley | Nov. 18, 1958 |

OTHER REFERENCES

Mixermobile publication, FM–LD10–12053, 2 pages, received U.S. Patent Office, August 26, 1955.

Mixermobile publication, Form No. MM–2153, 8 pages, received U.S. Patent Office, August 26, 1955.